(12) United States Patent
Tiltman et al.

(10) Patent No.: US 9,653,063 B2
(45) Date of Patent: *May 16, 2017

(54) ACOUSTIC REFLECTORS

(71) Applicant: SUBSEA ASSET LOCATION TECHNOLOGIES LIMITED, Portland, Dorset (GB)

(72) Inventors: Carl Peter Tiltman, Weymouth (GB); Andrew Malcolm Tulloch, Reading (GB)

(73) Assignee: SUBSEA ASSET LOCATION TECHNOLOGIES LIMITED, Portland, Dorset (GB)

( * ) Notice: Subject to any disclaimer, the term of this patent is extended or adjusted under 35 U.S.C. 154(b) by 1 day.

This patent is subject to a terminal disclaimer.

(21) Appl. No.: 14/964,076

(22) Filed: Dec. 9, 2015

(65) Prior Publication Data

US 2016/0086596 A1 Mar. 24, 2016

Related U.S. Application Data

(63) Continuation of application No. 13/354,731, filed on Jan. 20, 2012, now Pat. No. 9,318,097, which is a
(Continued)

(30) Foreign Application Priority Data

Jul. 29, 2009 (GB) .................................... 0913199.6
Jul. 29, 2009 (GB) .................................... 0913200.2
(Continued)

(51) Int. Cl.
*G01K 11/20* (2006.01)
*G10K 11/20* (2006.01)
(Continued)

(52) U.S. Cl.
CPC .......... *G10K 11/205* (2013.01); *B29C 39/003* (2013.01); *B29K 2009/00* (2013.01); *B29K 2083/00* (2013.01)

(58) Field of Classification Search
CPC .... B29C 39/003; G10K 11/205; G10K 11/20; B29K 2009/00; B29K 2083/00;
(Continued)

(56) References Cited

U.S. PATENT DOCUMENTS 3,214,974 A * 11/1965 Altman ................. G01F 23/296
367/151
4,973,965 A * 11/1990 Ridge .................... H01Q 15/23
342/11
(Continued)

FOREIGN PATENT DOCUMENTS

AU 199871067 B2 4/1998
GB 2 422 282 7/2006
(Continued)

OTHER PUBLICATIONS

International Search Report for PCT/GB2010/051161, mailed Feb. 14, 2011.
(Continued)

*Primary Examiner* — Luke Ratcliffe
*Assistant Examiner* — Amie M N'Dure
(74) *Attorney, Agent, or Firm* — Nixon & Vanderhye P.C.

(57) ABSTRACT

An acoustic reflector comprises a shell surrounding a solid elastomeric core free of joints. The shell transmits acoustic waves incident on the surface of the shell partially into the core to be focused and reflected from an area of the shell located opposite to the area of incidence so as to provide a reflected acoustic signal output from the reflectorpartially around the circumference of the shell and to combine constructively with the reflected acoustic signal output. The
(Continued)

ratio of the speed of sound wave transmission in the shell to the average speed of the wave transmission in the core is preferably in the range of 2.74 to 3.4 best results being in the range of 2.74 to 2.86 inclusive.

7 Claims, 14 Drawing Sheets

Related U.S. Application Data continuation-in-part of application No. PCT/GB2010/051161, filed on Jul. 16, 2010.

(30) Foreign Application Priority Data

| Jul. 29, 2009 | (GB) | 0913201.0 |
|---|---|---|
| Jul. 29, 2009 | (GB) | 0913203.6 |
| Jul. 31, 2009 | (GB) | 0913387.7 |
| Jul. 31, 2009 | (GB) | 0913388.5 |
| Aug. 19, 2009 | (GB) | 0914462.7 |
| Sep. 1, 2009 | (GB) | 0915073.1 |
| Oct. 12, 2009 | (GB) | 0917714.8 |
| Dec. 7, 2009 | (GB) | 0921397.6 |
| Dec. 7, 2009 | (GB) | 0921399.2 |
| Feb. 4, 2010 | (GB) | 1001810.9 |
| Apr. 13, 2010 | (GB) | 1006093.7 |
| Dec. 8, 2011 | (GB) | 1121116.6 |

(51) Int. Cl.
  *B29C 39/00* (2006.01)
  *B29K 9/00* (2006.01)
  *B29K 83/00* (2006.01)

(58) Field of Classification Search
  CPC .......... G01S 15/74; G01S 11/16; G01S 13/74; G01S 11/14; G01S 13/767; G01S 15/87; G01S 15/96; G01S 5/22; G01S 7/52004; G01S 7/537; G01S 12/753
  USPC .............................................. 367/2
  See application file for complete search history.

(56) References Cited

U.S. PATENT DOCUMENTS

| 5,822,272 | A  | * | 10/1998 | Ream, Jr. | G01V 15/00 367/131 |
|---|---|---|---|---|---|
| 6,580,661 | B1 | * | 6/2003 | Marschall | G01V 1/3808 367/153 |
| 6,772,993 | B1 | * | 8/2004 | Miller | F16K 47/08 251/333 |
| 8,910,743 | B2 | * | 12/2014 | Tiltman | G10K 15/00 181/110 |
| 2011/0100745 | A1 | * | 5/2011 | Emery | G10K 11/205 181/175 |

FOREIGN PATENT DOCUMENTS

| GB | WO 2006075167 A1 * | 7/2006 | ........... G10K 11/205 |
|---|---|---|---|
| GB | 2 437 016 | 10/2007 | |
| GB | 2 437 016 | 5/2008 | |
| GB | 2 458 810 | 10/2009 | |
| WO | WO 2006/075167 | 7/2006 | |
| WO | WO 2009/122184 | 10/2009 | |

OTHER PUBLICATIONS

International Preliminary Report on Patentability dated Jan. 31, 2012 for PCT/GB2010/051161.
Office Action mailed Jan. 5, 2015 in U.S. Appl. No. 14/287,488.

* cited by examiner

ACOUSTIC REFLECTORS

CROSS-REFERENCES TO RELATED APPLICATIONS

This application is a Continuation of U.S. patent application Ser. No. 13/354,731, filed Jan. 20, 2012, which is a Continuation-in-Part of:
a) International Application No. PCT/GB2010/051161 filed in English on 16, Jul. 2010 claiming priority to GB Applications Nos:
0913199.6—29, Jul. 2009
0913200.2—29, Jul. 2009
0913201.0—29, Jul. 2009
0913203.6—29, Jul. 2009
0913387.7—31, Jul. 2009
0913388.8—31, Jul. 2009
0914462.7—19, Aug. 2009
0915073.1—1, Sep. 2009
0917714.8—12, Oct. 2009
0921397.6—7, Dec. 2009
0921399.2—7, Dec. 2009
1001810.9—4, Feb. 2010
1006093.7—13, Apr. 2010
b) GB Application No. 1121116.6 filed 8, Dec. 2011.

The entire contents of these applications are incorporated herein by reference.

BACKGROUND OF THE INVENTION

Field of the Invention

This invention related to passive acoustic reflectors and markers for underwater use.

Discussion of Prior RT

Passive acoustic reflectors are known, for example, from UK Patent GB2437016A (THE SECRETARY OF SATE FOR DEFENCE) Oct. 10, 2007 (incorporated herein by reference). In UK Patent 2437016 a passive acoustic reflector has a wall arranged to surround a core, said shell being capable of transmitting acoustic waves incident on the shell into the core to be focused and reflected from an area of the shell located opposite to the area of incidence so as to provide a reflected acoustic signal output from the reflector, characterised in that the core is in the form of a sphere or right cylinder and is formed of one or more concentric layers of a material having a wave speed of from 840 to 1500 ms$^{-1}$ and that the shell is dimensioned relative to the core such that a portion of the acoustic waves incident on the shell are coupled into the shell wall and guided therein around the circumference of the shell and then re-radiated to combine constructively with the said reflected acoustic signal output so as to provide an enhanced reflected acoustic signal output.

More recently other potential applications for acoustic reflectors have emerged to mark underground, gas pipes and the like, which unlike other underground objects, such as electricity cables, are very difficult to detect using conventional electro-magnetically based detection systems.

Known reflectors including those seen in WO2009/122184A (published after the earliest priority date of the present application) comprise hemispherical shells. When the core is solid, such as an elastomer, the elastomer is cast into the two halves of the shell. This is labour intensive in manufacture because of the need carefully to check and top up the core castings after initial solidification and to ensure a flat level surface on the tops of the two halves of the core. The performance of such is not always predictable and furthermore when made according to the construction described will distort and/or fail when immersed in water of any depth, or when raised. This is because:
a. The separate halves of the core are joined together, this causes a discontinuity in acoustic paths in the shell, with the risk also of small gaps between the parts of the core, with consequential structural weakness and huge variations of performance between one reflector and another;
b. The shells and ores are glued together, and are inherently of weak construction for deployment in water of any depth.

SUMMARY OF THE INVENTION

According to the present acoustic reflector comprises a shell surrounding a core, said shell having one or a plurality of acoustic windows through which acoustic waves incident on the surface of the shell are transmitted into the core, and in which acoustic waves entering the core are reflected from the interior of the shell opposite the window(s) back towards and through the window(s) in which the core is solid.

It has been found that excellent performance is achieved if the ratio of the speed of sound wave transmission in the shell to the average speed of the wave transmission in the core is in the range 2.5 to 3.4 or a multiple thereof.

Preferably said ratio is the range of 2.74 to 2.86 inclusive or a multiple thereof.

The inventors have found, quite unexpectedly, that peak target echo strength occurs at ratio of about 2.82, with a strength of −4 dB, but within the range it is generally better than −15 dB, and in the range 2.5 to 3.4 is better than −10 dB. Outside this range reflectors are less suitable for commercial application as the diameter of the reflector has to increase significantly to compensate for reduced target strength. For example if the ratio is 2.48, the target echo strength has fallen to −27 dB. Operating within the range acoustic reflectors of 300 mm in diameter or less are perfectly feasible, although for other reasons explained blow, 100 mm is probably the practical lower limited for commercial reflectors operating in a sub-sea environment because the frequencies to which the reflector will respond increase markedly The shells can be formed of non-metals, for example a material selected from the group comprising glass reinforced polyphthalamide, polypropylene, aluminium or an alloy thereof, a resin impregnated fibre, in which the fibre itself is selected from the group comprising carbon fibre, aramid fibre, poly(p-phenylene-2,6-benzobisoxazole) (PBO) fibre, nylon 6 and polythene fibre. In the case of fibre, by varying the amount of fibre in the composite the speed of sound can be adjusted to match the application.

Of potential metal shells aluminium and its alloys are particularly good as shell materials as aluminium reflects about 50% of incident acoustic signals, the rest being absorbed and passed through in the core or the shell. This compares with steel, for example, where only a relatively small percentage of the incident acoustic radiation is passes into the material, the rest being reflected.

Other potential core materials include have speed around 1620 ms−1, butyl rubbers NASL-H862A and B252 (Ref: Lastinger in NRL memorandum AD733978 "Speed of Sound in Four Elastomers") which has a wave speed around 1620 ms−1, RTV11 is an interesting core material as, as other elastomers its wave speed can be varied by loading with calcium carbonate. However. The inventors have found that a shell manufactured with 25% glass fibre reinforced polyphthalamide with a silicon elastomer core of RTV12 produces excellent reflection of incident acoustic waves at specific frequencies. 25% glass fibre reinforced polyphthalamide is sold under the trade name Zytel® HTN51G25HSL by E.I. du Pont de Nemours and Company. A similar glass fibre reinforced polyphthalamide is markets under the trade mark Amadel by Solvey SA. Polythalamide based shells are particularly advantageous in the context of this invention as they are hard, and have a quick transition at around 310° C. from a solid to liquid phase, without substantial softening below that temperature. This characteristic means that shell can be filled with liquid core materials below that temperature and the core material cured without risk of distortion. Realisation of acoustic reflectors according to this invention opens the possibility of designing reflecting devices for all kinds of applications. Polyphthalamides with higher glass fibre content of 35%, 45% and 60% are obtainable, these provide even harder shells, but as the glass fibre content increases so does the brittleness of the final product and the speed of acoustic transmission in the shell.

In one particularly advantageous application, an acoustic reflector is characterised in that it comprises an elongate substantially cylindrical structure with a central rod acting as the core surrounded by an elongate shell of tubular cross section.

Such a reflector can be attached, for example, to a pipe section to mark the pipe below water or ground. If a plurality of such reflectors, say four, are pre-attached to a pipe section before the pipe section is immersed in water, it easily and economically provides a system for marking the pipe section; if all pipe sections in pipe line have such markers attached the pipeline as a whole can be marked.

In another embodiment of the invention an acoustic reflector according to this invention is toroidal.

In a further embodiment of the invention an acoustic reflector according to the invention is mounted on an underwater object to monitor scouring of the bed of a mass of water to which it is to be placed. The reflector may be mounted on such an object as part of the construction of the object prior to it being placed in the water.

The invention provides a method of monitoring scouring underwater scouring around an object comprising attaching at least one acoustic reflector according to this invention, and positioning said acoustic reflector below the natural level of the bed of the water mass concerned such that scouring may expose the reflector enabling it to be detected on interrogation by an acoustic beam.

Advantageously an acoustic reflector according to this invention attachment means to attach the acoustic reflector to a rope, cable or the like which is conveniently an eye. If the reflector has an elastomer or other non-metallic core, a hole may be provided in the shell to fill the core. This hole is plugged and the eye is conveniently attached to the plug. As an alternative the reflector may be mounted in a net.

In another embodiment of the invention a method of monitoring or marking an underwater object or area comprising positioning at least one acoustic reflector according to the invention at the object or area of interest, enabling the reflector to be detected on interrogation by an acoustic beam. This may, for example, be by attaching the reflector to a high value object or container which is at risk of being lost or an aircraft black box. Another aspect of the invention is to attach such a sonar reflector a diver or the diver's equipment, and to interrogate the reflector by sonar to identify the diver's positions.

A further application of a reflector according to the invention is to indicate to underwater mammals that employ echo location systems for their navigation the presence of particular areas by marking such area or object with one or a plurality of sonar reflectors according to the invention. In a further development of this application it becomes possible to use underwater mammals for economic purposes, such as identifying, retrieving or delivering items, by step of training such mammals to recognise the presence of an acoustic reflector according to the invention.

Acoustic reflectors according to the invention can be positioned under the sea by attaching the reflectors to a rope, cable, net or the like, on reeling the rope, cable or net from a drum. The location of the reflectors at the point of lying can be identified by using a towed sonar array towed by a vessel on which the drum is mounted, obviating the need to use separate submersible mounted sonar systems for the purpose.

Realisation of acoustic reflectors according to this invention opens the possibility of designing reflecting devices for all kinds of applications.

One example is to indicate to underwater mammals that employ echo location systems for their navigation, the presence of particular areas or objects by marking such area or object with one or a plurality of sonar reflectors according to the invention. In a further development of this application it becomes possible to use underwater mammals for economic purposes, such as identifying, retrieving or delivering items, by the step of training such mammals to recognise the presence of an acoustic reflector according to the invention.

Another example is to enable location finding with respect to a known location of one or more reflectors. This could be particularly useful for autonomous underwater vehicles (AUVs) which rely on inertial navigation systems (INS) for position finding. It is well known that the INS of such vehicles require to be recalibrated following descent of the vehicle to depth and this could be achieved by interrogation of reflectors having known spectral characteristics and known positions. To aid the identification of specific reflectors for purposes of providing a datum location, it may be convenient to set out a group of reflectors in a specific pattern and this could be in the form of a pre-prepared combination e.g. on a plate or mat. The same type of arrangement may also be useful for locating an object of interest on the seabed such as a well head or pipe valve with different numbers and/or arrangements of the reflectors being indicative of a specific object being marked. The sonar source can be mounted on any conventional carrier, such as a submarine or other manned submersible, permanently mounted underwater sonar, a dipping sonar mounted on a boat, aircraft or helicopter, or an AUV.

Triangulation systems are possible, in which receivers are located at three different places and the specific location of an object is identified by conventional triangulation means.

Other examples include:

marking of a specific geographic location of a submerged object or the application to an object in preparation for subsequent submergence either alone or in combination with other similar sonar reflectors/active location devices to provide an aid to location (red+green versus red+blue for example) i.e. pipelines, power cables, telephony cables, fixed equipment on the seabed;

application to a submerged device or the application to a device in preparation for subsequent submergence which will mark the current location of the device within or at the bottom of the water column or on the seabed, i.e. the marking of cables or other devices which are moved around either freely or within certain bounds such with the tide and/or current or other movable assets;

marking underwater parts of oil or gas platforms or the remains of such platforms which could include using differently tuned reflectors as a means for identifying the ownership, function or type etc. of particular categories of underwater asset;

marking locations which have sub-sea/navigational significance for example, for shipping lanes, as in-port location aids, for wrecks or other navigation hazards such as coral reefs, underwater rocks etc.;

marking or indicating zones of economic or commercial interest, for example national maritime boundaries for say mineral extraction rights;

identification of high value containers lost overboard from vessels, or lost in aircraft accidents, or the location and recovery of aircraft black boxes;

geophysical structure monitoring such as marking and monitoring the movement of mid ocean rifts;

marking dangerous objects on the seabed for later disposal such as wrecks and mines for example;

diver tracking.

An interesting application of the invention is to mark passages or objects for guiding dolphins and porpoises and under-sea mammals that use echo location. The frequency of the sounds produced by bottlenose dolphins, for example, ranges from 0.25 to 150 kHz. Higher frequency clicks (40 to 150 kHz) are used primarily in echolocation. Peak frequency of typical echolocation clicks is about 100 kHz, but frequency varies considerably with specific echolocation tasks. By manufacturing sonar reflectors to reflect at this frequency and attaching such reflectors to underwater objects, the objects can be marked to guide such mammals. In particular it is possible to train dolphins and the like to recognise particular sonar reflectors and to use them to take items to the area of the reflector, to recover items from the area of the reflector.

A problem that was also identified with acoustic reflectors of UK patent 2437016 was in manufacture when an elastomer core was used, the elastomer cracked sometimes on curing causing fissures to occur within the reflector, affecting its performance. One solution proposed is to provide a hole in the shell, with the elastomer initially poured into the shell through the hole, cured, topped up by overfilling, cured again, the excess elastomer removed and the holed plugged.

Another potential problem is that there is a statistical risk that with reflectors of the kind described in the preceding paragraph, having non-metallic shells, and deployed in deep water (more than 5000 meters) that water can enter. When the reflector is raised the surface, the pressure of any water that entered would be substantially greater than that of the surrounding water or the air, with the risk of a sudden and catastrophic failure of the shell of the reflector.

Existing manufacturing methods can be cumbersome in some cases, and cannot be used with cores made of materials that are solid, such as metal or ceramics or which are already cured or not free-flowing in the uncured state. Although other manufacturing methods for reflectors described here, there is a desire to seek a low cost uniform method of manufacture of acoustic reflectors which may be adapted to control any risk from rapid decompression of entrapped water.

Accordingly, an acoustic reflector a further embodiment of the present invention is characterised in that the shell comprises two halves joined together and surrounds the core. In a spherical reflector the shell comprises two hemispheres which can be joined by spin or laser welding.

Where the shell is made of a material which may fail under internal pressures as a result of decompression of the reflector when it is raised to the surface the shell halves can be provided with a region at their joint of reduced resistance to internal pressure.

In the case of hemispheres with a spin weld between them the circumference of the spin welded area may be of reduced thickness or of reduced strength.

Initially one of the halves may have a vent to release trapped air when the two halves are put together around a core. The vent is sealed when manufacture is complete. The sealing can be appropriate to the material of the shell, including spin welding a small plug, filling with resin etc.

In the case of a shell made of two hemispheres, the exposed edge of one hemisphere may have an upstanding tongue to engage in a groove formed in the corresponding exposed edge of the other hemisphere. If the hemispheres are to be spin welded together, the edge of the tongue and the inside of the groove may bay one or more upstanding small tabs which preferentially melt to form the weld when one hemisphere is turned rapidly with respect to the other.

If the hemispheres are of non-metallic material which is statistically at risk of failure from internal pressure, the tongue may occupy about half the groove initially so that the welded material does not fill the whole of the groove after spin welding providing a circumference of weakness, for a glass reinforced polyphthalamide shell which might normally fail at 170 MP, the hemispheres' joint would be designed to fail at 50 to 100 MP, allowing any internal pressure to be released safely.

In another aspect of the invention, a method of manufacturing an acoustic reflector according to the invention comprises the step of joining the shell together from two hemispheres around a core.

In a spherical acoustic reflector the method of manufacture comprises joining two hemispheres together around a spherical core.

The method of manufacture may additionally comprise the step of spin welding the said two hemispheres together.

The spin welding may comprise the step of spinning a tongue formed on the exposed edge of one hemisphere within a groove formed on the exposed edge of the other hemisphere. Additionally this step may include the step of melting upstanding tabs on the tongue and groove together to form the weld.

Further the method of manufacture may include the steps of preparing the core to the shape and size that it would be when deployed in a reflector, placing the said core in a place where the temperature is below that at which it would be deployed, allowing substantially all the core to reach said temperature, removing the core from said place, and placing it between two halves of the shell, sealing the two halves of the shell together.

Preferably any trapped air is allowed to vent though a vent in one of the halves before the vent is sealed.

A manufacturing process as described in the previous two paragraphs avoids the risk of included air pockets and fissures in cores made by other methods. The only way of double checking the integrity of reflectors made by the other method is by non-destructive testing, such as X-ray examination, after the reflector is made. At that stage after completion of the manufacturing process the write off cost is a reflector does not meet the specification is comparatively high. By deploying the technique of the preceding paragraphs, cores can be examined for their integrity before they are deployed in shells when the write off costs are still low.

In a typical reflector, with the silicon elastomer RTV 12 for the core, the RTV 12 is overfilled in a spherical mould to the size required for its deployment, cured, and removed and the sprue cut off. The intended core can be examined for integrity and, if satisfactory, place in a domestic refrigerator. Hemispheres of glass reinforced polyphthalamide with a tongue on one hemisphere and a groove on the other are made in a conventional way. The RTV 12 core is taken from the refrigerator and placed in one of the hemispheres. The other hemisphere is then placed on the core with the tongue of one hemisphere engaging the groove in the other. The two hemispheres are spin welded together as described. As the core returns to ambient temperature, it expands driving air trapped between the core and the hemispheres out of a small vent in one of the hemisphere. After the core has fully reached ambient temperature, say after 24 hours, the vent is sealed with resin. Metals cores, ceramic cores and other elastomer cores can be prepare in a similar way, although casting rather than moulding would be the more appropriate method of preparing the core in many circumstances.

BRIEF DESCRIPTION OF THE DRAWINGS

Embodiments of the invention will be described, by way of example only, with reference to the accompanying drawings in which.

DETAILED DISCUSSION OF EMBODIMENTS

Figure 1A:
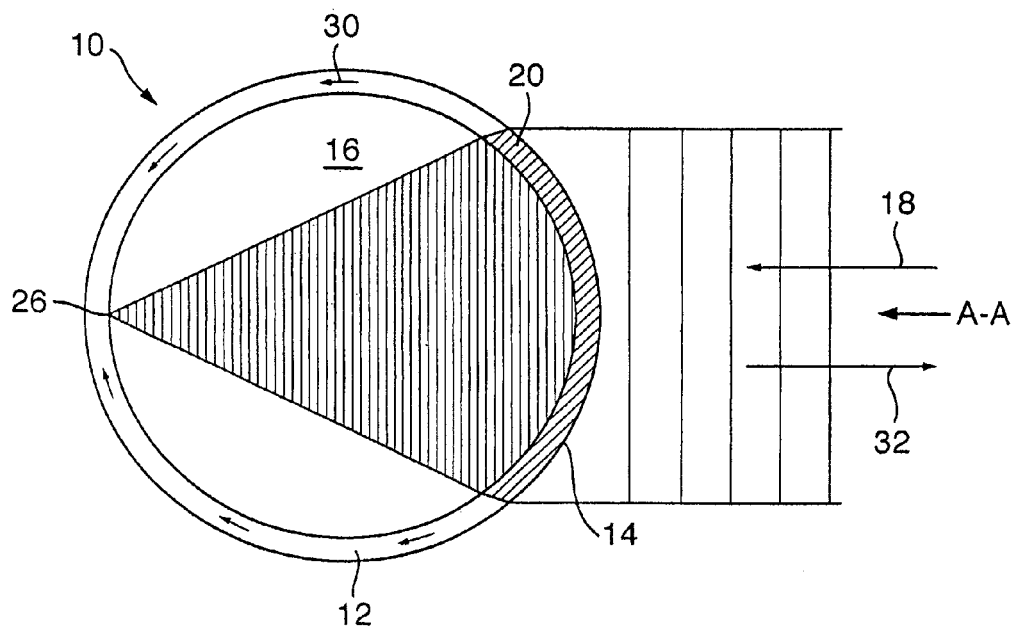
FIG. 1A shows a spherical acoustic reflector according to the invention in a schematic section.
Figure 1B:
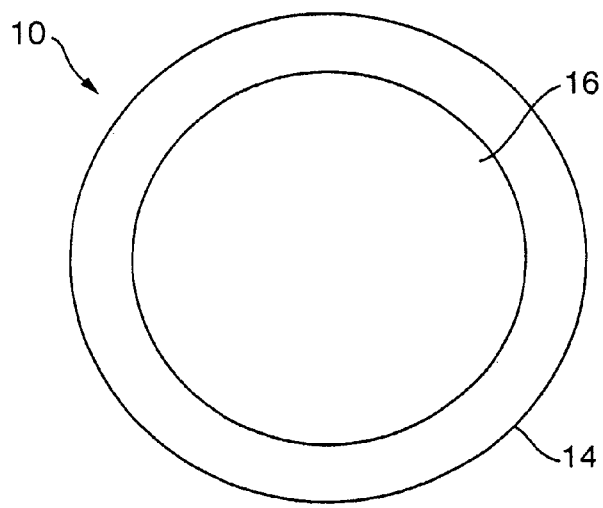
FIG. 1B shows another view of the reflector seen from the direction of an incident acoustic signal, looking in the direction A-A of FIG. 1A.

Referring to FIGS. 1A and 1B, an acoustic reflector 10 comprises a spherical shell 12 surrounding a core 16. The shell 12 is formed from 25% glass fibre reinforced polyphthalamide. The core 16 is RTV 12.

Acoustic waves 18, transmitted from an acoustic source (not shown), are incident as shown the outside wall 14 of shell 12. The shell has acoustic transmission window 20, its exact diameter being dependent on the diameter of the shell, acoustic waves incident on this window 20 are transmitted through shell 12 and into core 16.

The incident acoustic wave striking windows 20 pass through the shell the shell 12 into core 16: to be focused a focal point 26 on the inside of shell 12 opposite window 20 to be reflected back to the window.

A portion of the incident waves 18 is coupled into the shell 12 and generates both elastic and transverse waves 30 which are guided within the shell 12 around its circumference. The strongest waves are the elastic ones. For reflectors in accordance with this invention, for certain frequencies, the elastic waves travelling around the shell wall 12 and the reflected acoustic arriving at the focal point 26 through the core are in phase with each other and combine constructively, to provide a further enhanced reflected acoustic signal output from the focal point along the axis of the reflector providing a strong response 32.

25% glass fibre reinforced polyphthalamide immersed in sea water has a very wide single acoustic window, aluminium and aluminium alloys on the other hand have a relatively narrow acoustic window either side of an orthogonal axis through the shell, in the direction of an incoming acoustic wave. If a tangent to the surface of the shell makes an angle of less than 65° with the orthogonal, incident waves will be reflected and not absorbed. However, if the tangent makes and angle of less than about 65° there is a second quite wide acoustic window, concentric with the first thorough which acoustic wave can enter the shell. This is shown in FIG. 2, here an acoustic reflector 10 comprises spherical aluminium or aluminium allows shell 12 surrounding a core 16. The shell 12 is formed from aluminium. The core 16 is butyl rubber NASL-H862A or B252 (alternatively the silicon based elastomer RTV11 loaded with 60% calcium carbonate can be used).

Acoustic waves 18, transmitted from an acoustic source (not shown), are incident as shown the outside wall 14 of shell 12. The shell has an annular transmission window 20, its exact diameter being dependent on the diameter of the shell, acoustic waves incident on this window 20 are transmitted through shell 12 and into core 16.

Figure 2A:
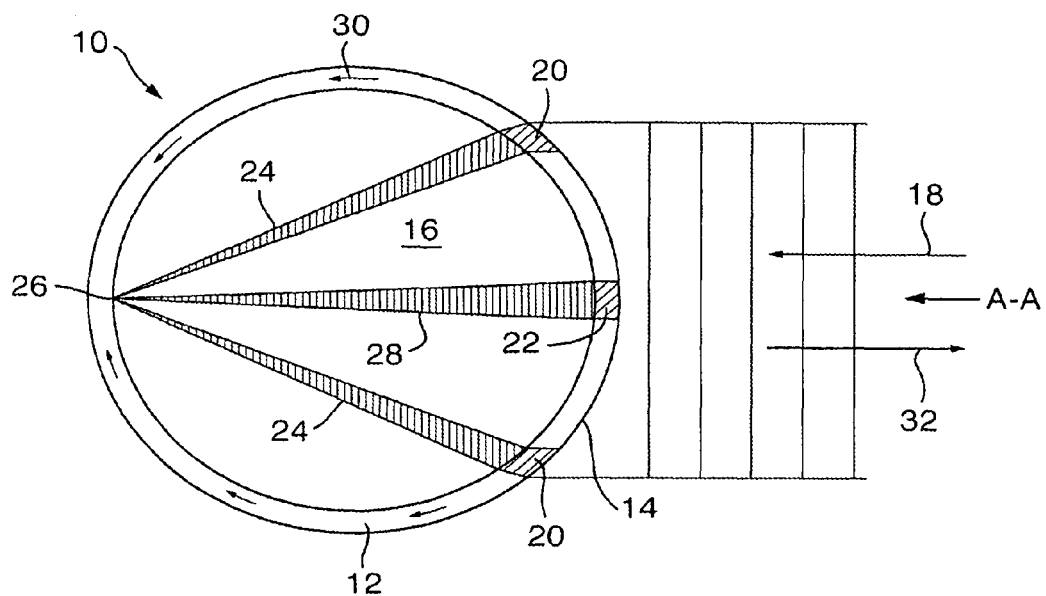
FIG. 2A shows a spherical acoustic reflector according to the invention in a schematic section, where the shell is constructed of a material having two acoustic windows.
Figure 2B:
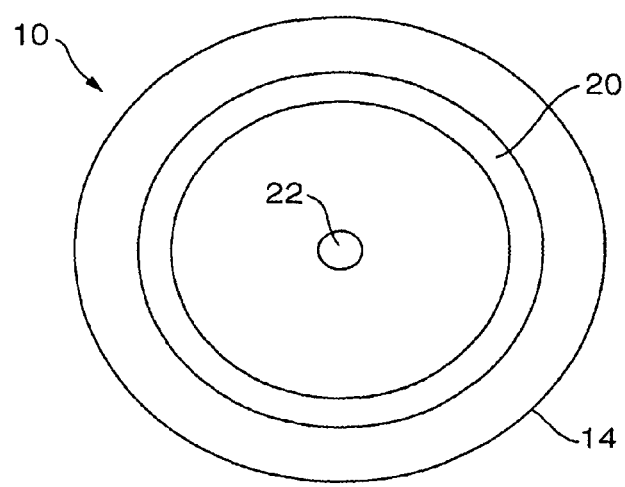
FIG. 2B shows another view of the reflector seen from the direction of an incident acoustic signal, looking in the direction A-A of FIG. 2A.

Aluminum and its alloys have a wide angle transmission window of about 40° to 50°, meaning that 50% of the energy in any acoustic wave striking the surface at an angle of about 25° (corresponding to a tangent of 65°) to 70° will pass into the aluminium shell. This region is shown as the annular window 20 as shown in FIGS. 2A and 2B. 50% of the energy in waves striking the aluminium surface at 90° in region 22, which is a central circular window, will also pass into the aluminium. The remaining energy is reflected from the surface of the reflector.

The incident acoustic wave striking windows 20 and 22 pass through the shell the shell 12 into core 16. The incident acoustic wave that passes through window 20 follows an annular cross sectioned path 24 to be focused a focal point 26 on the inside of shell 12 opposite window 22. Acoustic waves that striking central window 22 follow a central path 28 to the focal point 26. The acoustic waves that have passed through windows 22 and 22 are reflected back along the central path 28.

A portion of the incident waves 18 is coupled into the shell 12 and generates both elastic and transverse waves 30 which are guided within the shell 12 around its circumference. The strongest waves are the elastic ones. Where the materials which form the shell 12 and the core 16 are in accordance with this invention, for certain frequencies, the elastic waves travelling around the shell wall 12 and the reflected acoustic arriving at the focal point 26 through the core are in phase with each other and combine constructively, to provide a further enhanced reflected acoustic signal output from the focal point along path 28 providing a strong response 32.

If RTV12 is used as a core material with an aluminium or aluminium alloy shell the ratio of the acoustic wave speed in the shell to that of the core is about 6:1.

Figure 3:
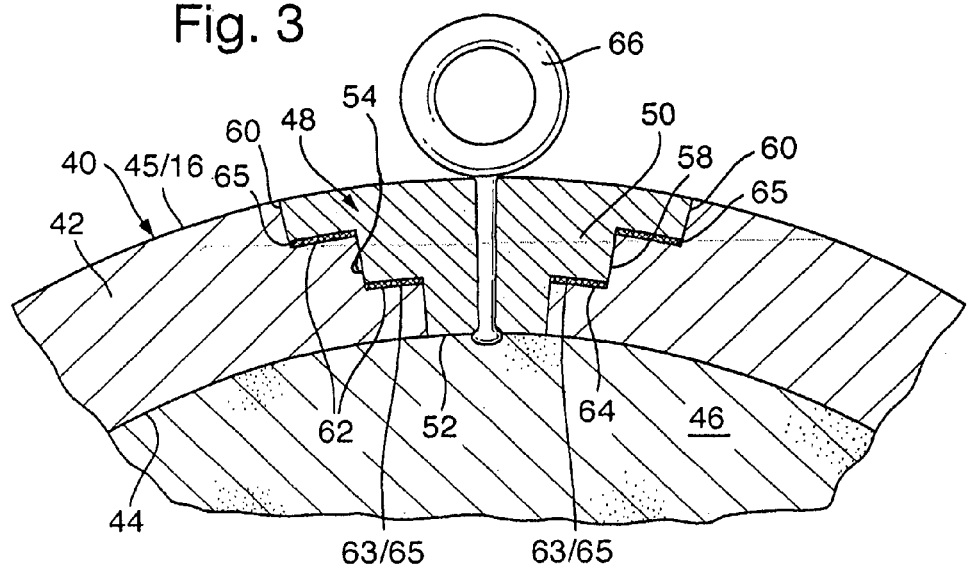
FIG. 3 shows a similar partial section through a non-metallic acoustic reflector having a plug with a ring attachment means.

In FIG. 3 an acoustic reflector 40 according to this invention comprises a shell 42 and a hole 48 penetrating the shell 42. The core 46 of the shell 42 is filled with a silicon based elastomer material RTV 12. The shell is 25% glass reinforced polyphthalamide.

The inside 52 of hole 48, corresponding to the inner wall 44 of the shell 42 is of a smaller diameter than the outside 54 corresponding to outer wall 45 of shell 42.

A plug 50 fills the hole 48 and is a tight fit therein. The plug 50 decreases in diameter from the outside of the hole 54 to the inside 52. The hole 48, rather than being tapered uniformly, has steps 64 formed it its side 58. The plug 50 has corresponding steps 62 in its side wall 60. The stepped portions 60 and 62 have small interfering tabs, which, when the plug is rotated rapidly, melt and form a friction weld 65 between the stepped potions 60 and 62. In this example an eye fitting 66 is provided on the outside surface of the plug enabling the acoustic reflector to be fixed to a post, stanchion, pier or other underwater object.

The core 46 is initially rough filled with core material through hole 48. As the core material is allowed to cure, any shrinkage cracks will appear. The core material is then topped up with further core material—slightly overfilling—and again allowed to cure. Excess core material is removed and the plug 50 is inserted. In this example the plug 50 is made of aluminium as is shell 42, this eliminates any interference with the acoustic signal transmitted around the shell. Friction welding of the plug 50 in hole 48 is possible, and this is done by rapidly rotating the plug 50, melting the tabs on stepped portions 60 and 62 causing a friction weld 65 to form between the stepped potions 60 and 62. If the plug and shell are of dissimilar materials, the tabs would be omitted and the plug may be constructed in a way to be hammered and glued into place. Once in water, water pressure will tend to keep the plug in place.

FIGS. 4A to 4F show alternative manufacturing means for a spherical acoustic reflector.

Figure 4A:
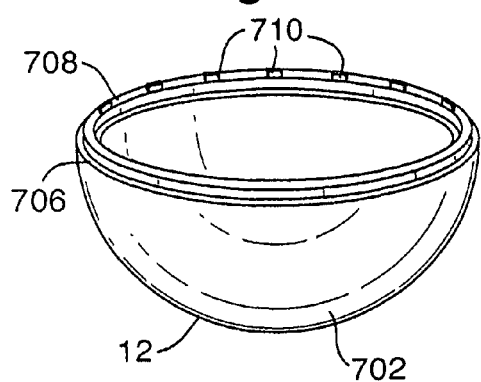
FIGS. 4A to 4C show various components to be used in a manufacturing process to make a spherical reflector according to invention.
Figure 4B:
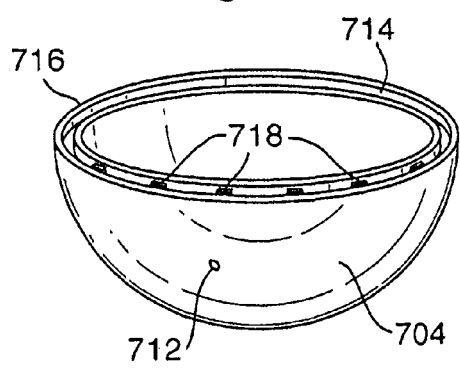
Figure 4C:
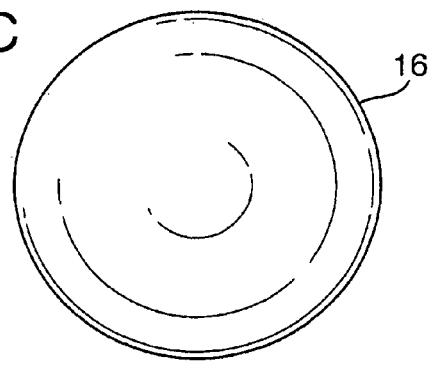
Figure 4D:
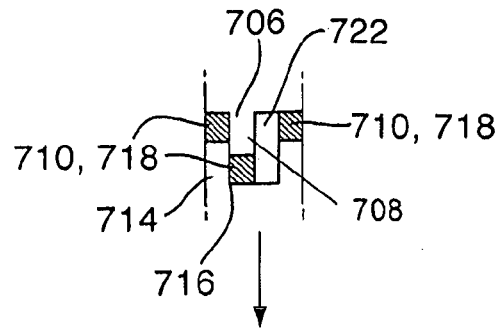
FIG. 4D to 4F shows an assembled acoustic reflector made from the components shown in FIGS. 4A to 4C, with FIGS. 4E and 4f showing detail of tongue and groove arrangements.

FIGS. 4A and 4B show respectively two hemispherical halves 702 and 704 of the shell 12 of a spherical reflector 10. The hemispheres are made of 25% glass reinforced polyphthalamide. The core 16 of the reflector, in this case a sphere of RTV12 is shown in FIG. 4C. The diameter of the core is such that it is very slightly larger, at ambient temperature than the inside diameter of the two hemispheres 702 and 704 when assembled together. A small vent 712 is provided in one of the hemispheres, it is not critical as to which. A tongue 706 is provided around the rim 708 of one of the hemispheres 702. The upstanding edges of the tongue 708 and the rim 706 have a plurality of tabs 710 distributed around their edges. A groove 714 is provided on the rim 716 of the other hemisphere 704, with the edges the groove 714 and rim 716 having a plurality of tabs 718.

The RTV12 for the core 16 is initially poured into an internally spherical mould of the right dimensions for the intended application and cured. The mould is overfilled leaving a sprue to reduce the opportunity for fissures to form. The sprue is removed and the moulded cured sphere of RTV12 checked for defects and placed in a refrigerator and left to ensure that it reaches a uniform temperature, below that at which the reflector is intended for use.

Subsequently the RTV 12 core is taken from the refrigerator and placed in one of the hemispheres, say 704. The other hemisphere, say 702, is then placed over the core 16 with the tongue 706 of hemisphere 702 engaging within the groove 714 in the other hemisphere 704. This can be seen in more detail in FIGS. 4D to 4F. The dimensions of the tongue and groove are such that a gap 722 is left between one side on the tongue and the wall of the groove 714 on that side. The tabs 710 and 718 mutually interfere if the hemispheres are turned. One hemisphere is spun with respect to the other, this causes the tabs 710 and 718 to melt and merge with each other forming friction welds 720 (seen in FIG. 4F) between the tongue 708 and groove 714.

Figure 4E:
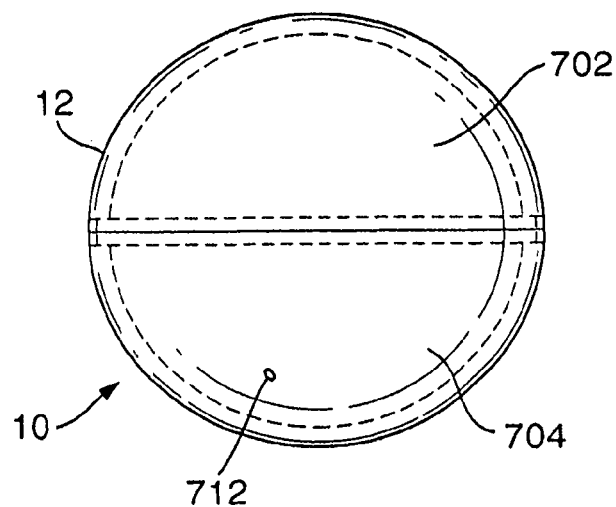
Figure 4F:
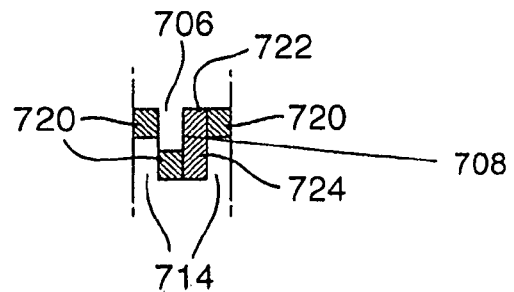
Figure 5A:
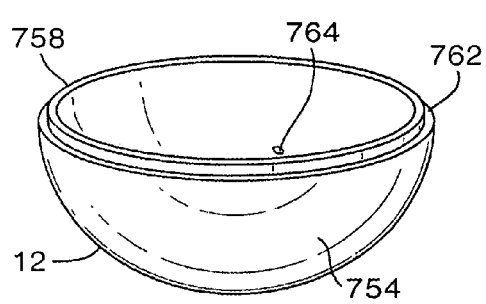
FIGS. 5A to 5D show an alternative structure to that shown in FIGS. 4A to 4F.
Figure 5B:
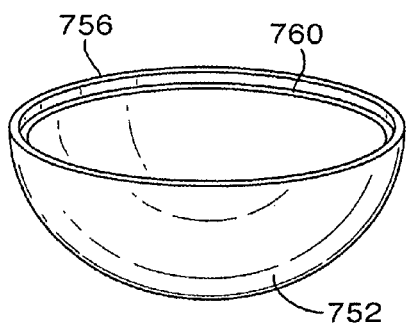
Figure 5C:
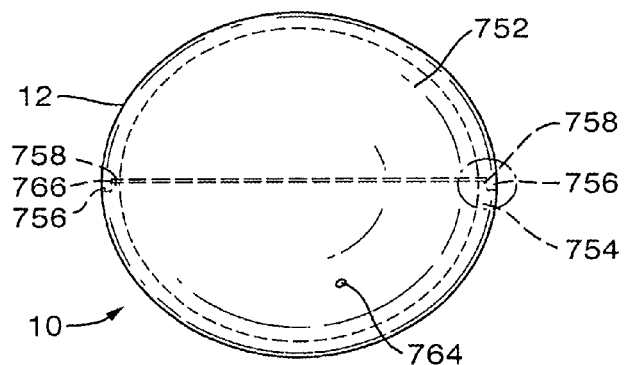
Figure 5D:
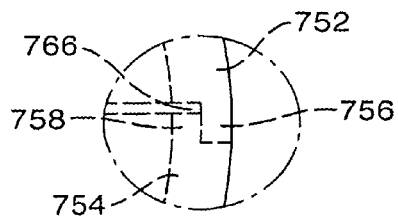

As seen in FIG. 4F, the gap 722 between the tongue and groove is loose filled with melt 724 from the melt, forming a weaker area around the diameter of the reflector. As the temperature of the core returns to ambient temperature, the core expands driving any air trapped between the core and the hemispheres out of the small vent 712. The final assembled reflector is shown in FIG. 4E.

Once the core has fully reached ambient temperature, say after 24 hours, the vent 712 is sealed with resin. As in this case the core is an elastomer, its expansion will ensure that it bears on the inner wall shell all around its surface, with no gaps.

The same principle can be applied to other combinations of materials. A particularly useful combination is that of an aluminium or aluminium alloy shell and an RTV 12 elastomer core. The manufacturing process is identical to that described, save that the vent 712 is plugged with an aluminium (or aluminium alloy) pin spin welded in place.

The cooling of the core and bringing it back to ambient is not an essential step in the manufacturing process but the inventors have found that minimising the trapped air in between the shell and core is desirable to ensure excellent acoustic coupling between shall and core, and including that step makes to resultant reflectors less prone to variation in performance due to minor variations in the core and shall dimensions within their normal manufacturing tolerances.

An alternative hemispherical construction is shown in FIGS. 5A to 5D. Here, the reflector 10 has a shell 12 formed of two hemispheres 752 and 754. The edges of the hemispheres have cut out steps 756 and 758, step 756 towards the outside of the rim 760 of hemisphere 752 and step 758 towards the inside of edge rim 762 of hemisphere 754. When the two halves are joined, the depth of step 756 is greater than the depth of step 758 to that when the hemispheres are brought together the greater depth of step 758 forms a circumferential portion 766 of reduced thickness close to the equator of the shell. The two hemispheres 752 and 754 are joined by friction or laser welding. To aid friction welding upstanding tabs may be provided on the outer edges of the steps 756 and 758 and on the cut away portions of the rims 760 and 762. A vent 764 is included in one of the hemisphere. The core is made as described with reference to FIG. 4C and the shell assembled around the core. The two hemispheres joined together as described by spin welding. Should water ingress though the shell into the interior of the reflector and a significant pressure differential occur between the inside of the reflector and the outside the reflector will fail preferentially at the internal circumferential potion of reduced thickness in a safe manner, rather than explosively.

Figure 6A:
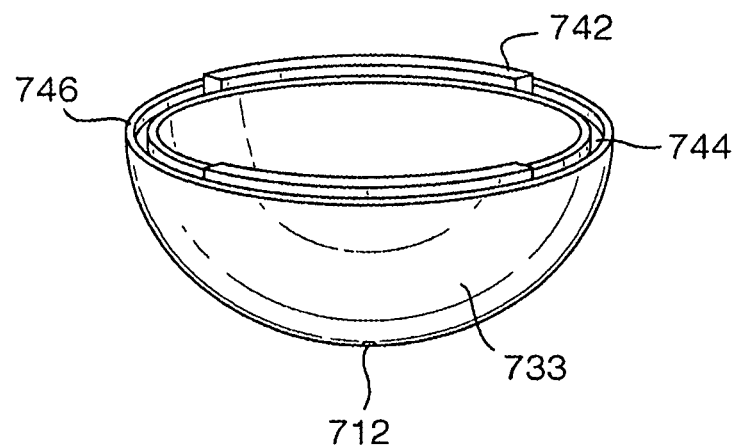
FIGS. 6A and 6B and FIG. 6C show a further alternative structures to that shown in FIGS. 4A to 4F.
Figure 6B:
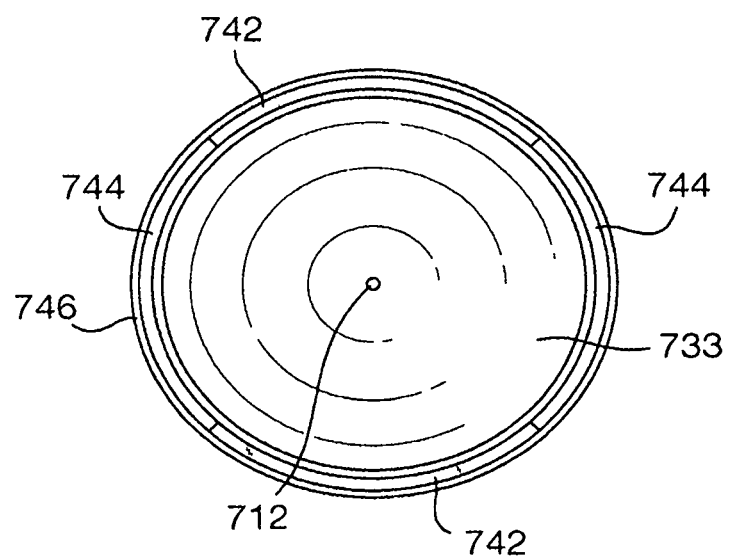

Another alternative hemispherical construction is shown in FIGS. 6A and 6B. FIG. 6A shows a side view of one of two identical hemispherical shell halves, and FIG. 6B show a top view, showing the inside detail of the shell half. The components main components of an acoustic reflector according to the invention are similar to those shown in FIGS. 4A to 4F. However the two hemispherical shell halves 733 are identical. These two identical hemispheres 733 comprise the shell 12 of a spherical acoustic reflector. In this example the hemispheres are made of aluminium alloy 6061T6. The core 16 of the reflector is cast RTV12 and is shown in FIG. 4C. A venting hole 712 is provided in each hemisphere.

Tongues 742 and grooves 744, each of equal length, are provided around the rim 746 the hemispheres 733. Two pairs of tongues and grooves are provided in this instance, so that the rim is effectively divided into four equal length sections, each section in turn around the rim having a tongue or a groove. When the two hemispheres 733 are assembled together, tongues 742 of each of the hemisphere are received into grooves 744 in the other.

The RTV12 for the core is prepared as described with reference to FIGS. 4A to 4F is from a two part mix and initially is poured into a shaped mould to form the core with the pimples and cured in a conventional way. The mould is overfilled leaving a sprue to reduce the opportunity for fissures to form. The sprue is then cut off once the core has cured. Subsequently the RTV 12 core is placed in one of the hemispheres 733. A two part epoxy resin glue such as Araldite® is spread on the tongues 742 and in the grooves 744 of both hemispheres 733 before the second hemisphere 733 is placed over the core with the tongues 742 of each of the hemispheres engaging with the grooves 744 of the other hemisphere. In this example, there is no gap between the tongue and groove in assembled. There is a small amount of rotational freedom of movement between the two hemispheres which can be used to ensure that the glue is evenly spread over the tongues and grooves and air excluded before it cures.

Finally, the vents 712 would be plugged using a pin, normally, in the same material as the shell glued using a two part epoxy resin glue.

Figure 6C:
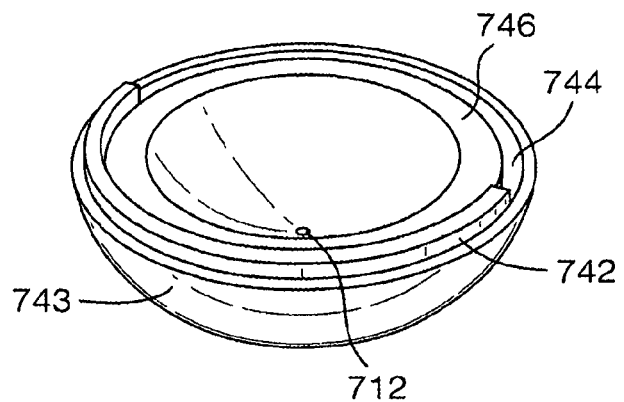

FIG. 6C is perspective view of another shell half, again one of two identical shell halves. In this case the entire circumference of the rim 746 of each hemisphere is divided into two, one half having a tongue the other having a groove to receive the tongue from the other identical hemisphere.

Although an aluminium alloy shell is described with reference to FIGS. 6A to 6C, the construction principle can be used in association with any appropriate shell material.

If the construction of FIG. 3 is to be adopted, the vent 712 or 764 in FIGS. 4 to 6 would be replaced by the larger diameter filling hole, the core filled and the reflector plugged as described in previously. In that case of the construction of FIG. 6, the hemispheres would have to be dissimilar with on hemisphere having a large hole and the other none.

Reflectors of this kind have different frequency responses for different incident acoustic wave, and that frequency response depends on the thickness of the shell.

Figure 19:
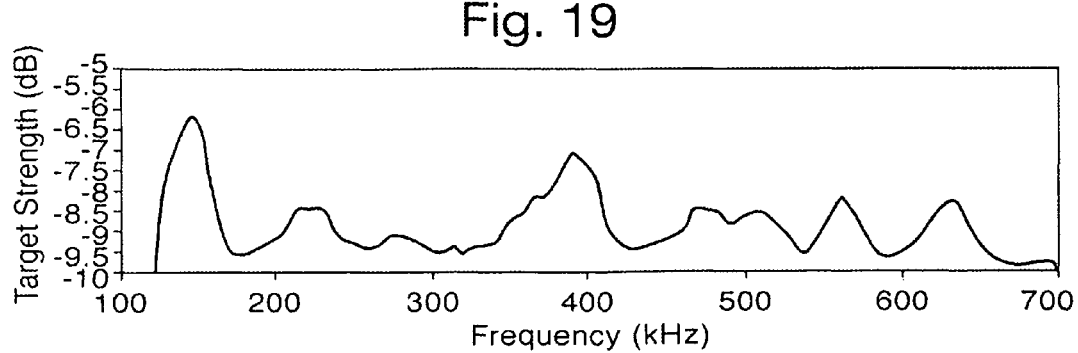
FIG. 19 shows the frequency response for a 200 mm RTV12 reflector with a 25% glass reinforced polyphthalamide shell

For a 100 mm reflector with an RTV 12 core and 25% glass reinforced polyphthalamide shell, best frequency response is obtained at 450 KHz with a 7 mm thick shell in a 100 mm diameter reflector the minimum practical operational frequency is 250 KHz with a 4 mm shell. With a 2 mm shell, best operational frequency is 690 KHz. For a 200 mm diameter reflector best response is obtained at 120 KHz with an 8.8 mm shell thickness. Other point readings are 4.4 mm shell 100 KHz, 6.1 mm 150 KHz, 8.1 mm 180 KHz, 8.3 mm 210 KHz, 13.7 mm 250 KHz, 14.0 mm 300 KHz. The minimum practical operating frequency with a 200 mm reflector is about 90 KHz. For a 300 mm reflector minimum operational frequency is 50 KHz with a 9.8 mm reflector, other sample designs are 100 KHz 9.4 mm thickness, 150 KHz 7 mm, 200 KHz 5.5 mm, and 250 KHz 13.7 mm. At each wall thickness a number of harmonic responses are obtained at higher frequencies, this can be seen in more detail graphically in FIG. 19 showing the response of a 200 mm diameter reflector with an 8.8 mm thick shell wall.

Reflectors according to the invention can be mounted on vertical cables suspended from an underwater buoy at sea, the cable itself being connected to a counterweight. A rope or the like tied to an eye mounted on the reflector can join the reflector to the vertical cable. This system can then be used to mark water objects or items of interest.

Figure 7:
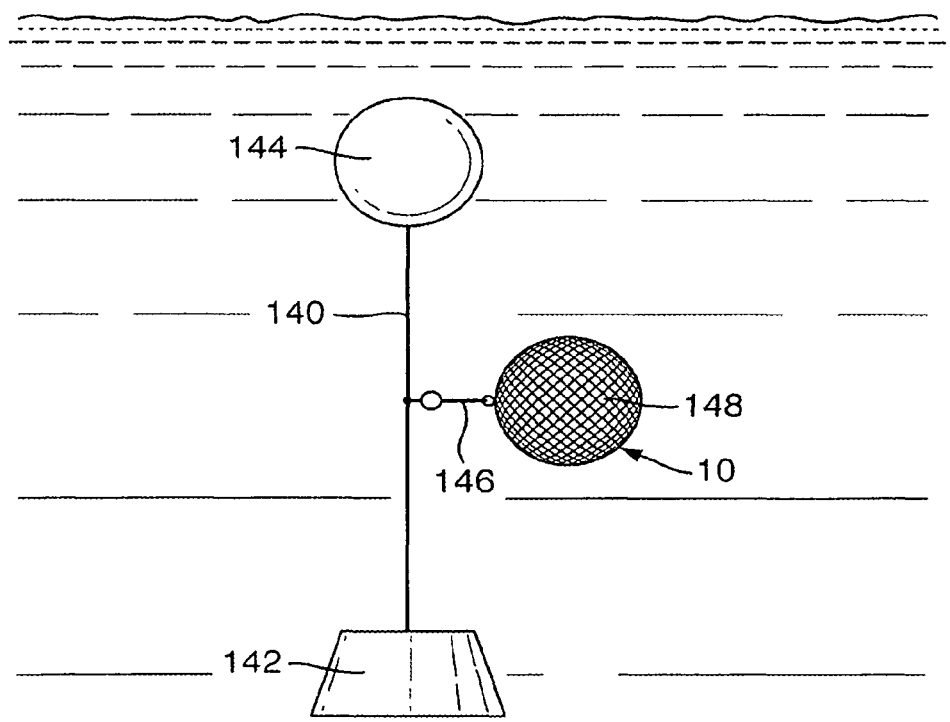
FIG. 7 illustrates the use a reflector mounted in a net to mark an item of interest.

In some circumstances, especially when the object to be marked is in a tidal region or area subjects to strong currents, excess strain can be imposed on the eye mounting on the plug by the interactions of the reflector with tidal and current movements, such that in extreme situations the any eye can break away. To avoid this, in FIG. 7 the reflector is contained in a net 148 connected by a rope or cable 146 to a further cable 140 suspended between buoy 144 and counterweight 142 rather than fixed by a rope through an eye.

Similar arrangements can be devised to enable the reflector is to be mounted against a vertical object, such as a stanchion or bridge pier, drilling platform leg.

Figure 8:
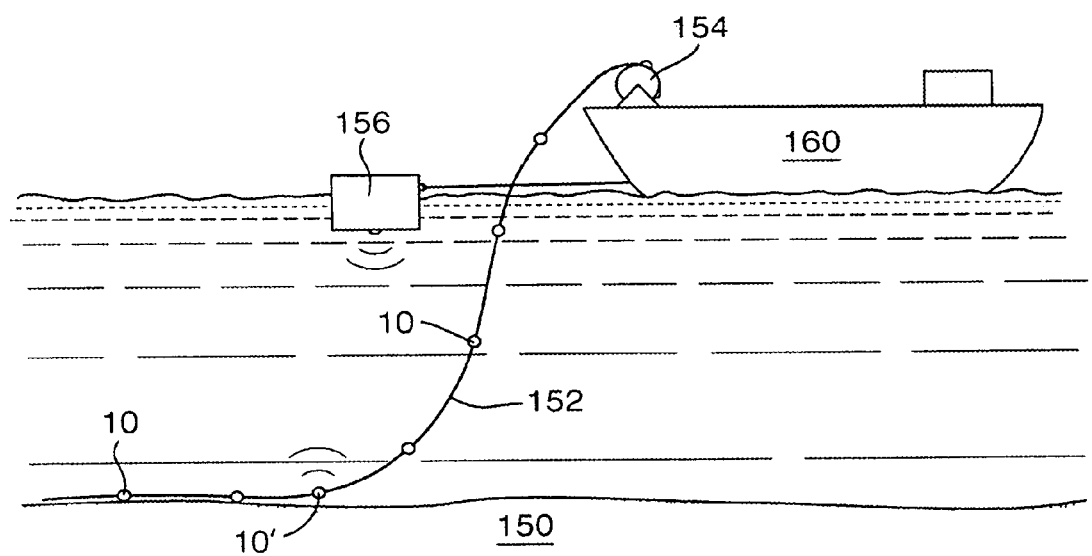
FIG. 8 illustrates the placement of a line of reflectors from a ship.

In FIG. 8, a number of acoustic reflectors 10 are to be laid on the sea-bed 150. The reflectors are linked by a cable 152 on a reel 154 mounted on the back of a cable laying vessel 160 towing a towed sonar array 156. Typically the cable may be 100 m or more in length. By designing the system such that the reflectors 10 lay above the cable 152 when they reach the sea bed 150 by attaching them to buoyancy means, for example, it is possible for a sonar signal from the towed array 156 to be reflected back by any particular reflector 10' to provide the towed sonar array with accurate information about the position of the reflector 10'. If this is done for each reflector when it reaches the sea bottom it is possible to plot the position of each of the reflectors. Previously this was only practical using a separate submersible. Although this has been described using a cable linking the individual reflectors, a rope, chain or net could be used depending on the circumstances.

Figure 9:
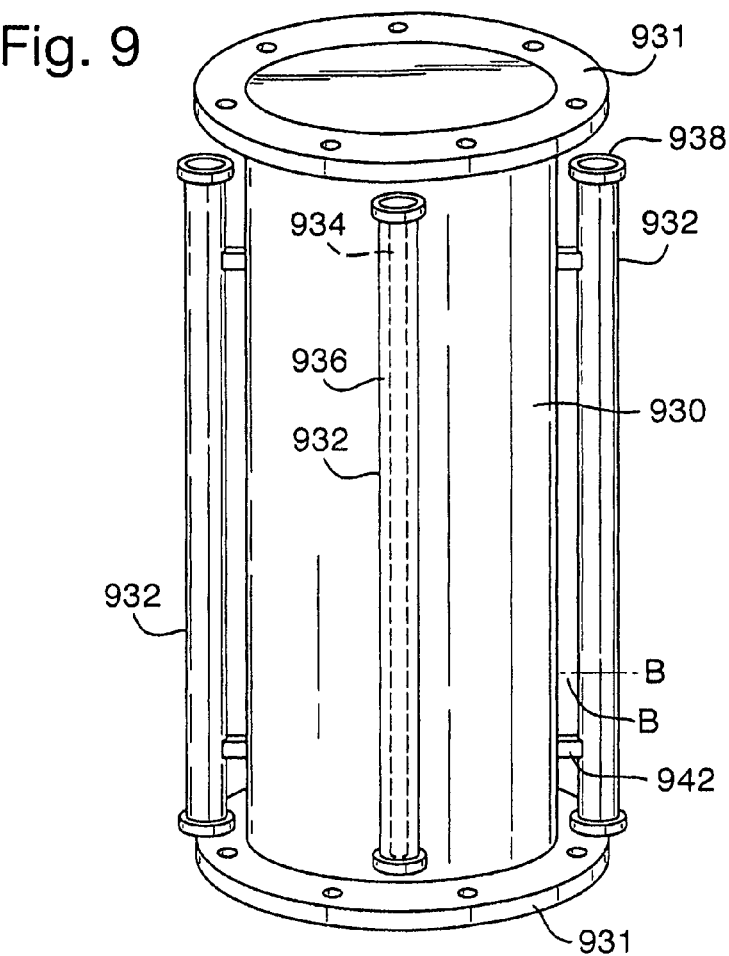
FIG. 9 shows a pipe section with elongate solid metal acoustic reflectors attached.

FIG. 9 shows a schematic diagram of a pipe section 930 fitted with a number of elongate cylindrical acoustic rod reflectors 932 each according to the invention. Each reflector silicon elastomer 934 is sheathed by an aluminium tube 936. Each of elongate cylindrical ends 938 of the reflectors 932 is capped and closed off by a conventional electrically insulating material, which, in particular isolates the aluminium tubes 936 from the pipe section and prevents any electrical conduction there between. The reflectors 932 are attached to the pipe section 930 through upstanding lugs 942 fitted to the pipes. The reflectors are electrically isolated from the pipe sections with insulating bushes fitted to the end of the lugs in a conventional manner. The pipe section 930 has conventional end flanges 931 with holes therein allowing it to be bolted to another pipe section. The pipe section with the acoustic reflectors can be prefabricated on land and joined by means of the bolt holes in the flanges 931 to another like fitted pipe. In this way, a pipe line fitted with acoustic reflectors can be assembled as part of the normal process for laying an underwater pipeline.

Figure 10:
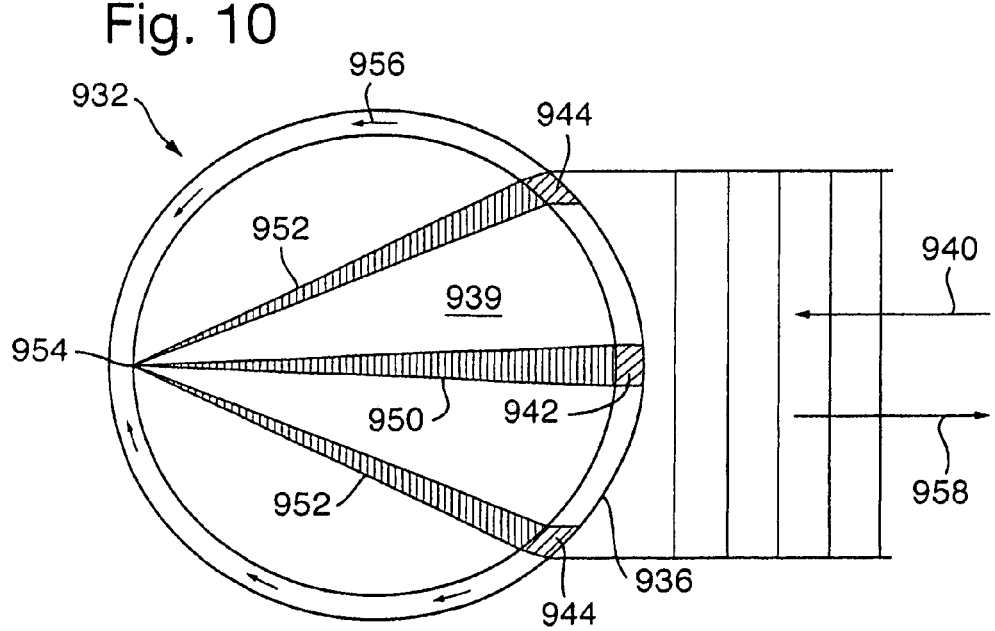
FIG. 10 is a schematic cross section through the acoustic reflector on the line B-B' of FIG. 9.

In operation the elongate acoustic reflectors of FIG. 9 work in exactly the same way as the spherical reflectors shown in FIGS. 2A and 2B. This is shown in FIG. 10. Acoustic waves 940, transmitted from an acoustic source (not shown), are incident as shown on the aluminium tube 936 forming the shell of rod 932. The tube 936 exhibits two regions disposed in the shell that act as transmission "windows", i.e. such that the incident acoustic waves are in these regions efficiently transmitted through the tube 936 and into core 939 of the rod 932. One region 942 will be at the centre of the in-coming beam, the other 944 will form an elliptical shape on the surface of the cylinder. The incident acoustic waves through window 942 follow one path 950 across the centre of the tube and other elliptically cross sectioned path 952 from the elliptical entry window 944 as they travel across the core 938 and are refracted and focussed onto focus 954 of inside of the cylindrical shell 936 opposite window 942. The waves on paths 950 and 952 are then reflected back along their respective paths. Some of the incident waves are also transmitted around and within tube 936 as shown by the headed arrows in tube 956 and these combine constructively at the focus 954 with the with wave on paths 950 and 852 to provide an enhanced reflected acoustic signal output 958 out of the reflector.

Although the elongate reflector in FIGS. 9 and 10 have been described in relation to a pipe section, the reflectors can be applied to other objects, such as oil rig platforms, accommodation platforms for workers at sea, and other objects to be placed under water. The principles can also be applied to land based objects such as gas pipeline as discussed below. The toroidal reflector 640 of FIGS. 11 and 12 can be constructed of glass reinforced polyphthalamide, aluminium or aluminium alloy for the wall 644 and RTV 12 as the core.

Acoustic waves transmitted from an acoustic source are incident on the external surface 642 of the reflector 640. Propagation of acoustic signals across the core 646 and around the wall 644 and the constructive interference at a point opposite the area of incidence has been described above. The materials are chosen such that the ratio of wave speeds around the core 646 in wall 644 to that through the core 656 is accordance with this invention.

Toroidal reflectors have the advantage for some purposes in that stronger reflections can be obtained when interrogated from the side, compared with the top or bottom.

Figure 11:
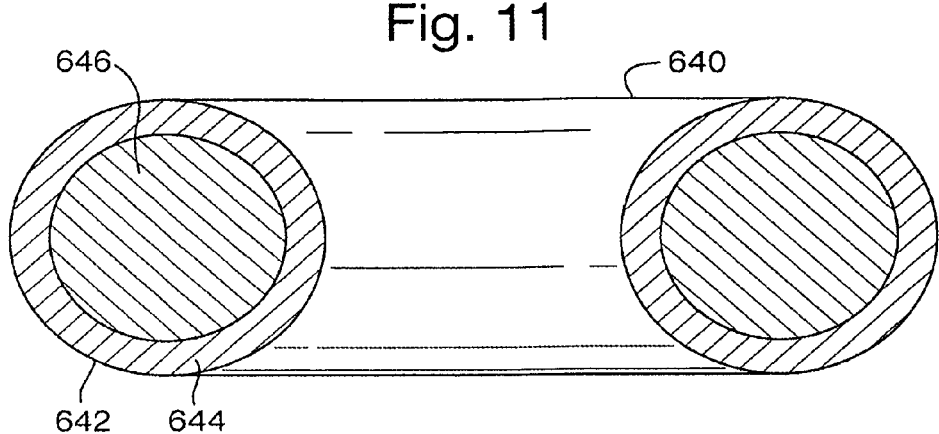
FIGS. 11 and 12 show a toroidal acoustic reflector according to the invention, FIG. 11 being a cross section on the line C-C' of FIG. 10.
Figure 12:
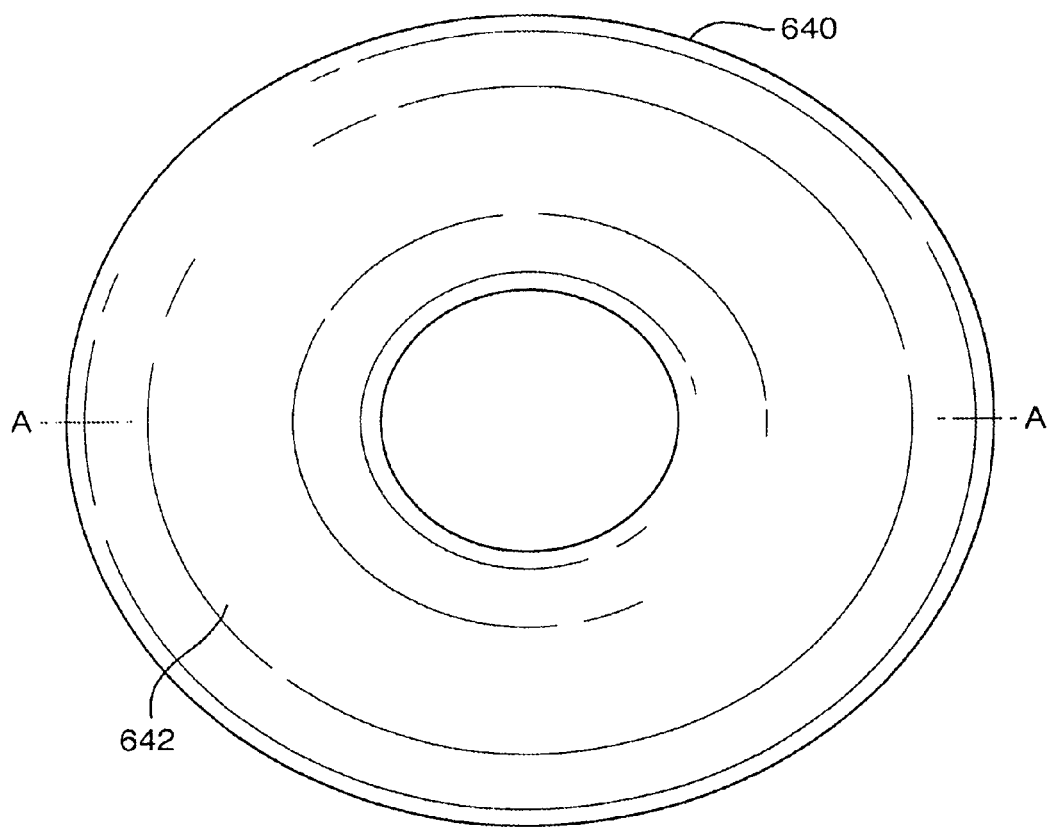
Figure 13:
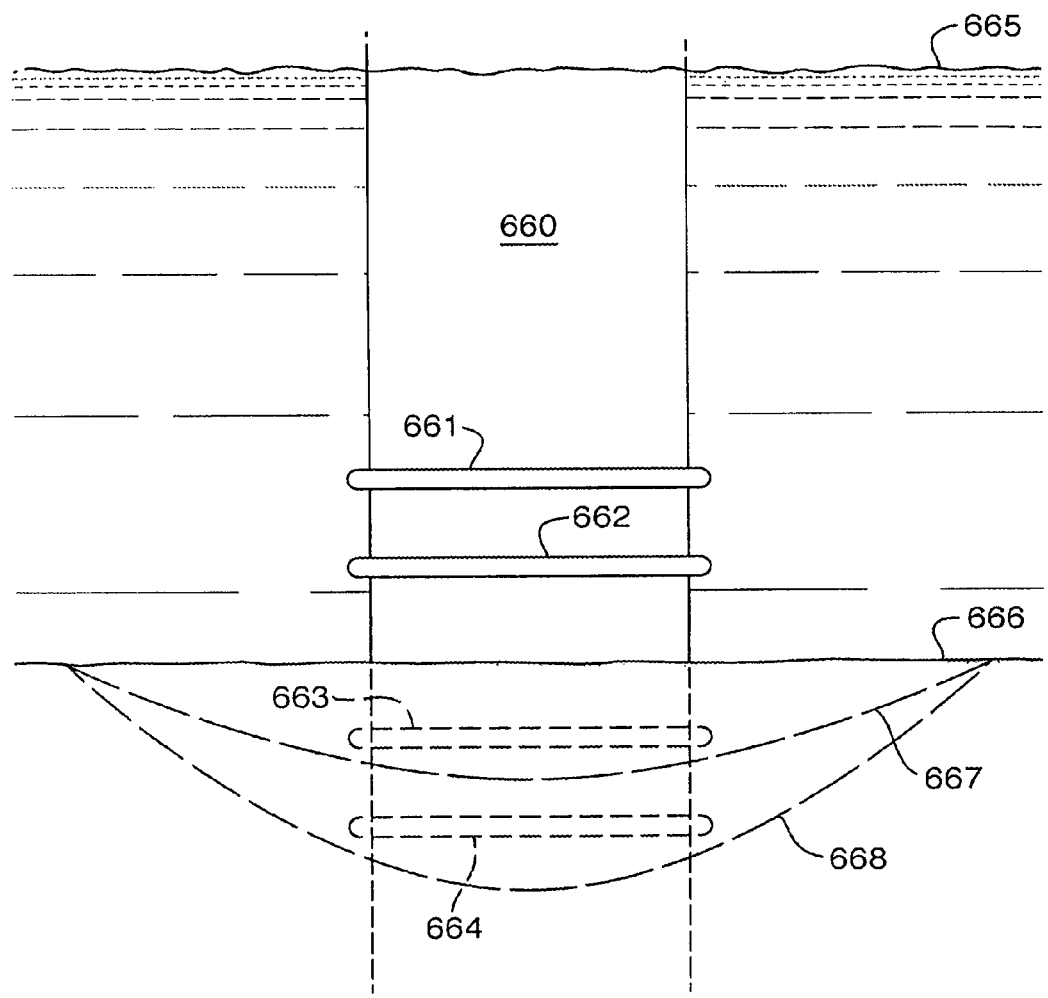
FIG. 13 shows the use of acoustic reflectors to identify scouring around an object, such as a bridge support, in water.

In FIG. 13 the lower portion 660 of stanchion such as a bridge pier is shown extending below surface of the sea bed 666. A series of acoustic reflectors 661, 662, 663 and 664 as described with reference to FIGS. 5 and 6 is mounted below on the lower portion 660 of the stanchion 660 below the sea surface 665. The reflectors can be of any design according to the invention, spherical, elongate cylinders as described in FIGS. 9 and 10, or toroidal as described in FIGS. 11 and 12. Toroidal reflectors of the kind shown in FIGS. 11 and 12 are illustrated. Those reflectors 661 and 662 permanently above the sea bed can be used to mark the underwater pier 660. Currents will scour the sea bed preferentially around the support item 660, eventually lowering the sea bed level to 667 exposing the acoustic reflector 663 which was initially below the sea bed. Detection of this reflector 663 by interrogation by a sonar signal will provide an early warning of scouring, and the need for possibly attention.

As scouring continues and the sea bed drops further as indicated by line 668, a second reflector is exposed, which may indicate that a potentially dangerous situation has developed and the underwater mounting of support item 660 may need urgent attention.

Although four acoustic reflectors have been illustrated, more or less may be used to suit the relevant design criteria.

Figure 14:
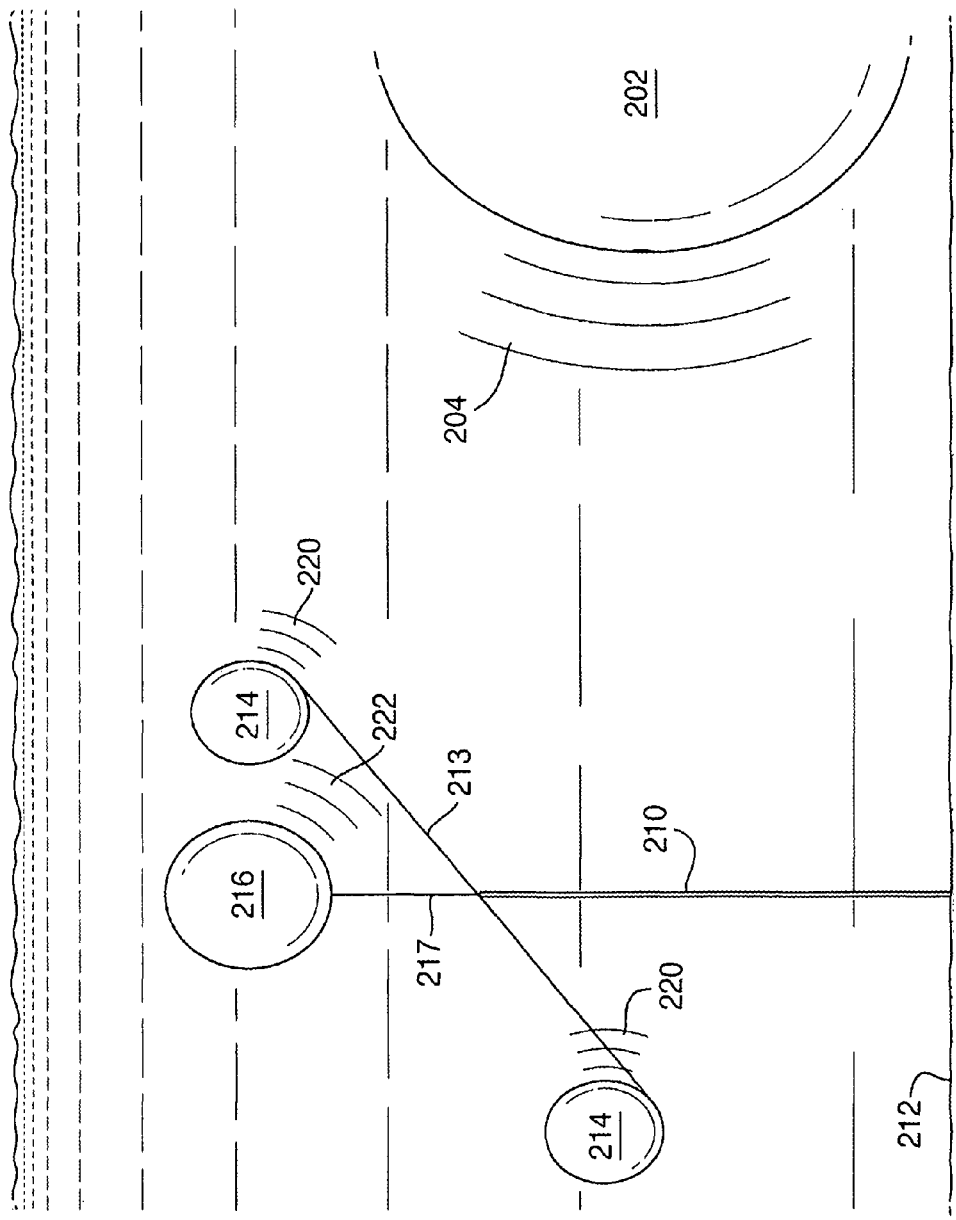
FIG. 14 illustrates the use of acoustic reflectors according to the invention to provide simple position information underwater.

A simple position indicating device is described in FIG. 14. Two identical acoustic reflectors 214 of the kind described herein are mounted underwater at the ends of a cross arm 213 of a trident-like mounting device 210 fixed to a sea-bed 212, say, between the legs of an oil rig platform (not shown). A further, larger, acoustic reflector of the same kind is mounted on an upstanding arm 217 of the trident 210 mid-way between the two smaller acoustic reflectors 214. Each of the reflectors is spherical, the two smaller reflectors 214 having a smaller diameter than the larger reflector 216.

A sonar array 202 attached to a submersible addresses the acoustic reflector with a relatively wide band sonar transmission. This transmission will be reflected as described above. However, the frequency make-up of the reflected signal varies according to the diameter of the reflectors, the smaller reflectors providing a reflected acoustic wave 220 having generally higher frequencies than reflected acoustic waves 222 from the larger reflector 216. These signals can be analysed conventionally when received by the submersible, with the reflected acoustic waves' power and angles of incidence giving information concerning the distance of the reflectors 214 and 216 from the submersible. Knowledge of the dimensions of the trident 210, the length of arm 213 and upstanding arm 217 can be used to compute, very accurately the position of the submersible with respect to trident 210.

This arrangement has one other interesting advantage. It is well know that short wavelength sonar signals attenuate much more rapidly than longer wavelength sonar signals. It is therefore clear that the reflected signal 222 from reflector 216 can be "heard" by the submersible at a much greater distance than the short wavelength reflected signals 220 from reflectors 214. Thus initial guidance of a submersible towards the target object marked by the trident 210 can be on the basis of the reflected acoustic signal 222 from reflector 216. As the submersible nears trident 210, reflections from the two smaller reflectors 214 will be obtained and final accurate steering of the submersible towards its objective achieved.

A more sophisticated position indication system employing the present invention is discussed with reference to FIGS. 15 to 18. In FIG. 9 a set of seven acoustic reflectors (001 . . . 007) as described above is arranged on the sea bed in a field 312 of interest. Each of the reflectors is designed to reflect incident acoustic radiation at one or more peak frequencies 316, 318, 320 as in FIG. 16. By selecting from three specific frequencies to which each reflector will respond, it is possible to code each reflector. Thus reflector 001 responds only at frequency 320 and nominally has the binary number 001. Reflector 006 responds at frequencies 316 and 318 and has the binary number 110 and so on for the other members of the set.

If now the field 312 is approached by a submersible 322 with sonar 324 emitting a signal 314 in a wide band, each of the reflectors (001, 002, 003 . . . 007) will respond with its corresponding binary number (001, 010, 011 . . . 111), characterised by the responses at each of the three frequencies.

Analysis of the returned signals will identify the position of the submersible 322 with respect to each of the acoustic reflectors 001 . . . 007.

Figure 16:
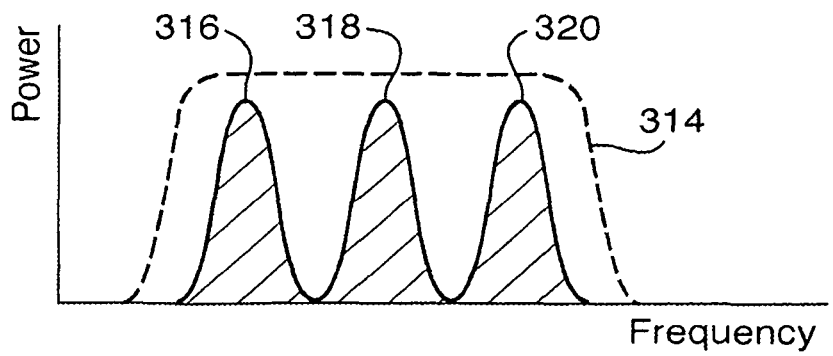
FIG. 16 illustrates the use of a wide band transmitter and reflections being returned at one or more of three specific frequencies from a field of the kind shown in FIG. 14 comprising seven reflectors.
Figure 17:
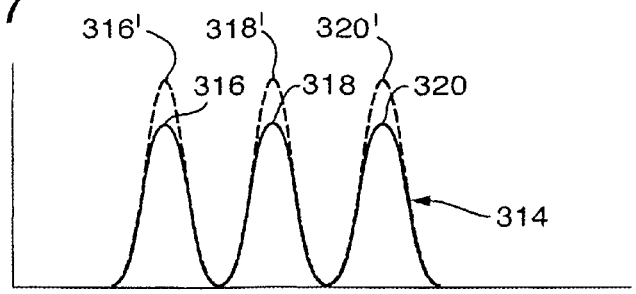
FIG. 17 illustrates the use of a transmitter transmitting only at the three frequencies of interest in the field of FIG. 14.

It will be seen that transmission of a wide band signal in the way shown in FIG. 16 is wasteful as only a small proportion of the energy is reflected. In FIG. 17, the transmission signal 314 is now organised so that it too is at the same frequencies 316', 318', 320' as those frequencies 316, 318, 320, to which the set of reflectors is designed to respond. In this way much less power if required of the submersible. Alternatively if the same total power is transmitted as in the wide band transmission of FIG. 16, the signal will travel far further enabling the field 312 to be "seen" from a greater distance.

Larger sets of acoustic reflectors to mark larger fields can built by using four or more frequencies, up to fifteen using four frequencies, thirty-one using five and so on.

Figure 15:
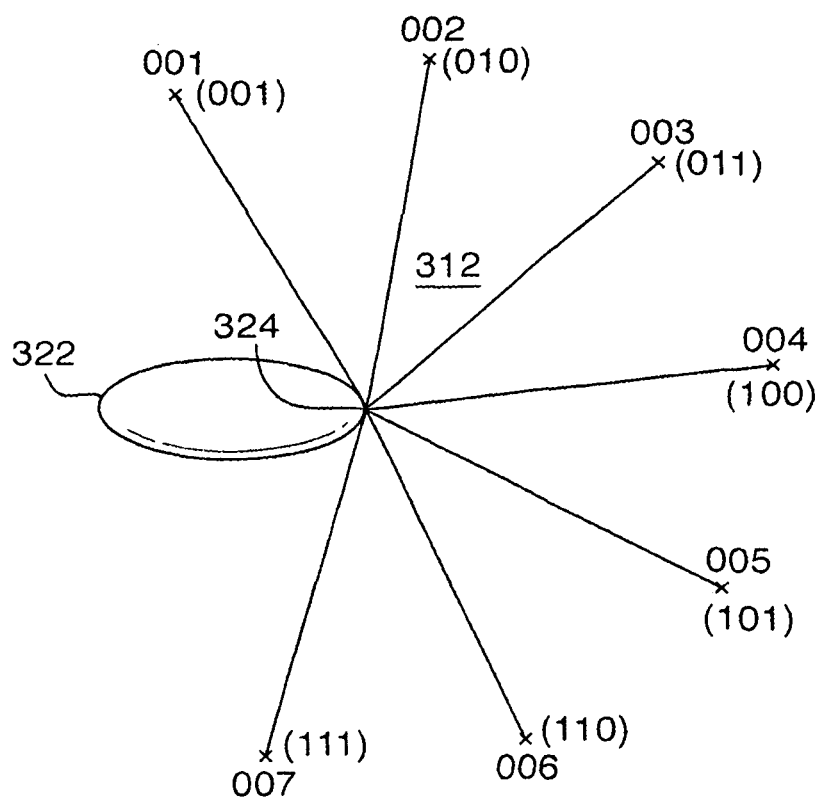
FIG. 15 is a schematic drawing of a more complex position information system showing a sonar fitted submersible interrogating a field of seven reflectors in accordance with the invention.
Figure 18:
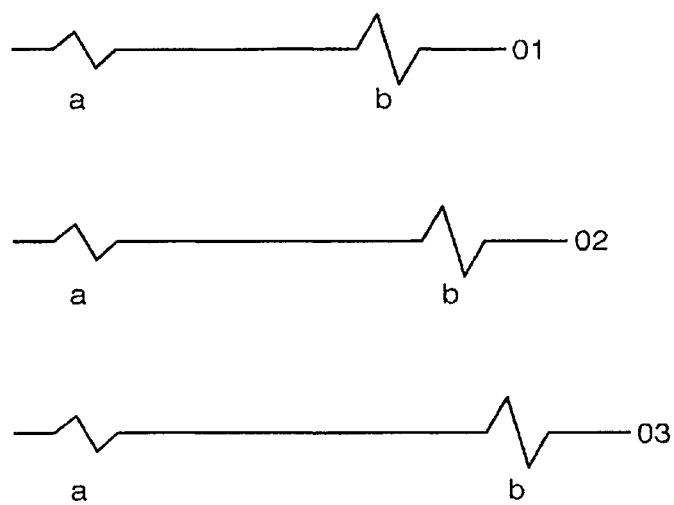
FIG. 18 illustrates an alternative arrangement to that discussed with reference to FIG. 16 using a wide band sonar transmission to interrogate a field of reflectors, each reflector having a different reflection characteristic to others in the field.

In the situation illustrated in FIG. 18 a set of acoustic reflectors is laid out on the sea bed as illustrated in FIG. 15. However, in this case the acoustic reflectors are of different diameters, with say reflector 001 being 15 cm in diameter, reflector 002 17.5 cm in diameter, with the diameters increasing in 2.5 cm steps to reflector 007. Apart from their diameters, the reflectors are identical. If now this set of reflectors is interrogated with a wide band sound transmission of the kind shown as 314 in FIG. 16, the response from reflector 001 will be as shown by the top waveform in FIG. 18. The left hand reflection is a reflection from the surface of the reflector without the sonar wave being transmitted around and though the reflector as described herein. The right hand reflection wave, the bigger response, is the reflected sonar signal that has been transmitted across and around the sonar reflector as described above.

Looking now at the second wave pattern, the patterns are identical save that the time lapse to the larger second reflection is longer, as a direct consequence of reflector 002 having a larger diameter than reflector 001. Looking at the third wave pattern the time separation of the two responses is even greater as a result of the greater diameter of reflector 003. This time lapse between the first reflection and the main reflection is characteristic, therefore, of each of the reflectors in the set and enables each member of the set to be uniquely identified. This approach using reflectors of different diameters is likely to be simpler in practice to use than the approaches illustrated in FIGS. 16 and 17, as noise arriving with the reflected signals may in some cases make the narrow pulses of FIGS. 16 and 17 less easy to distinguish from each other, without further processing.

The applicants have found that use of acoustic reflectors of the kind described herein can provide the acoustic underwater equivalent of air borne chaff which is widely used to divert or confuse heat seeking missiles and the like which locate hot spots, such as engines on aircraft, by using infra-red guidance. Underwater the normal target seeking mechanism for submersibles is sonar.

A system using the invention to disguise or protect a vessel in water comprises a plurality of passive acoustic reflectors according to the invention to be deployed into water around the vessel, wherein the acoustic reflectors are tuned to reflect sonar signals at specific acoustic frequencies perceived as a threat. The acoustic frequencies to which the acoustic reflectors are tuned may be the frequencies used by submersibles seeking a target using sonar, or the frequency of sound waves emitted by the vessel itself while travelling through water.

The designed frequency at which reflectors of the kind described herein is a function of the diameter of the reflector and the thickness of the shell. Therefore, by designing these parameters, a system can be designed to deploy a large number of reflectors to reflect sonar signals at a particular frequency of concern. A system covering a wide spectrum can be designed by including reflectors operating at a number of different frequencies to counter a range of threats to a vessel.

Systems of this kind can be used for protecting vessels against threats, say from a target seeking torpedo, which identifies potential targets by sonar sounding, of for rendering the vessel invisible to the sonar of submarines or ships or to so called "dunking sonar" systems. The system can also be used to mask the emitted acoustic signal of a vessel itself by scattering the emitted sound and allowing a vessel to leave port, for example, without being detected by acoustic listening devices.

Systems of this kind can be very simple. For a surface ship a number of acoustic reflectors can be stored in a net and released when needed. The deployed reflectors can be linked together by cables or ropes or in nets as described above and recovered when the threat which led to deployment had been removed. In submarines the passive sonar reflectors according to this invention could be deployed through tubes.

In some situations buoyancy may be an issue, with the reflectors tending to sink or rise to the surface of the water. If the reflector has a plug with an eye as described buoyancy aids can be attached to the eye to help counteract any tendency of the reflector to sink, similarly weights can be attached to counteract any tendency to rise to the surface, maintaining the reflector at the required level to disguise a vessel from unwelcome sonar detection.

It has also been found that such sonar reflectors according to the invention can provide a simple method of measuring sonar operational performance on a ping by ping basis and to provide a realistic target mimics for operator training and exercise. Such sonar reflectors can be manufactured individually to have different responses, to provide different kinds of targets for training purposes.

Ideal water conditions allow for sonar detection of an object (which could be a swimmer of submersible, for example) out to ranges of 800 m to 1000 m. However changes of temperature, salinity and suspended particulates can affect the range dramatically and conditions can change significantly in a very short time.

Such sonar reflectors provide a consistent target strength which only varies as water conditions changes and do not require a shore power supply or batteries to operate making installation and maintenance substantially simpler. By deploying such a sonar reflector a suitable point at the desired range marker, for example, over the side of a small vessel with a suitable weight and other fixings supplied, it is possible to provide a training method for sonar detector operators. Alternatively by laying a trail of such reflectors on the sea-bed at regular intervals out to the maximum range of a deployed sonar, it is possible to calibrate the actual range over which the sonar can actually detect an object at that particular moment. The latter can be important in a security environment, where, say, the entrance to a harbour is being monitored, for is detection of an object is possible at the maximum range of the sonar, a swimmer will take at least 25 minutes to reach the harbour, if the underwater detection range is reduced the swimmer will be much closer, say 6 minutes away, before detection. This change in detection range makes all the difference between having a threat response team on the dockside or in the water.

A particularly useful application of reflectors of the kind described in the invention is in the making of underground plastic or other non-metal pipes, particularly those used to carry gas for which currently there is no way of marking them, and which can only be found by trial and error. If when such a pipe is laid, or once laid is found, reflectors according to this invention can be buried close by the pipe. A low frequency ground penetrating acoustic wave will be reflected back from the reflectors and detected at the surface by an acoustic microphone, thus indicating the presence of the reflector and thus the pipe.

One interesting possibility is to note that the acoustic wave velocity in butyl rubber and silicon elastomers is more temperature dependent than in less elastic materials, such as metals and ceramics. It is possible therefore to tune a core made of one of these materials carefully to the application in which it is to be used. A reflector to be deployed in deep ocean, which is colder than water near the ocean's surface, may use a less dense elastomer than one to be used in shallower water. In all the examples using butyl or silicon based elastomers in the core it is possible to increase the wave speeds in the elastomer by adding calcium carbonate to the elastomer before it cures. Thus, if in practice, the specific elastomer can be optimised for use in the core by altering the calcium carbonate content. The inventors have found that the practical maximum calcium carbonate in the elastomer is just over 30% by volume; at higher volumes the calcium carbonate attenuates the sound wave and significantly degrades the output.

FIG. 19 illustrates the frequency response of a spherical acoustic reflector 200 mm in diameter with an 8.8 mm thick shell. It will be seen that the maximum response is at frequency of just over 120 KHz, but significant secondary responses occur at about 230, 385, 470, 520, 570 and 625 KHz. This information can be used to finger print the reflector in a system as described in the preceding paragraphs. By changing the wall thickness or the diameter an entirely different set of responses will be obtained and that information can be used uniquely to identify the reflector of interest.

The invention claimed is:

1. An acoustic reflector comprising a shell surrounding a core, said shell comprising one or a plurality of acoustic windows through which acoustic waves incident on the surface of the shell are transmitted into the core, and in which acoustic waves entering the core are reflected from the shell opposite the window(s) back towards and through the window(s) and in which the core is a solid and in which the core is a solid join-free moulded butyl or silicon elastomer material and the shell comprises aluminum or an aluminum alloy and wherein the shell comprises two halves having rims around their edges, the rim of each half comprising upstanding portions overlapping one another form a joint therebetween.

2. An acoustic reflector according to claim 1 in which the rim of each half comprises one or more upstanding portions forming a tongue(s) and one or more groove(s) and in which the tongues of each half engage with the grooves of the other half.

3. An acoustic reflector according to claim 2 in which the shell comprises two halves having a tongue and groove joint between the halves, and wherein the halves are identical, with each half comprising alternating grooves and tongues disposed in turn around the rim of the shell and each tongue is of equal length to a groove.

4. An acoustic reflector according to claim 1 in which the reflector is cylindrical and comprises a central rod acting as the core surrounded by an elongate tubular shell.

5. An acoustic reflector according to claim 4 attached to an underwater pipe section.

6. An acoustic reflector according to claim 1 which is toroidal.

7. An acoustic reflector according to claim 1 mounted on an underwater object as a scouring monitor.

* * * * *